(12) United States Patent
Chou et al.

(10) Patent No.: US 7,071,708 B2
(45) Date of Patent: Jul. 4, 2006

(54) CHIP-TYPE SENSOR AGAINST ESD AND STRESS DAMAGES AND CONTAMINATION INTERFERENCE

(75) Inventors: Bruce C. S. Chou, Hsin Chu (TW); Wallace Y. W. Cheng, Hsin Chu (TW); Chen-Chih Fan, Chu Pei (TW)

(73) Assignee: LighTuning Tech. Inc., Hsinchu (TW)

( * ) Notice: Subject to any disclaimer, the term of this patent is extended or adjusted under 35 U.S.C. 154(b) by 173 days.

(21) Appl. No.: 10/825,313

(22) Filed: Apr. 16, 2004

(65) Prior Publication Data

US 2005/0231213 A1    Oct. 20, 2005

(51) Int. Cl.
  *G01R 27/26*   (2006.01)
(52) U.S. Cl. .......................... 324/662; 324/690
(58) Field of Classification Search ............... 324/662, 324/690; 257/415, 418; 73/794, 796
See application file for complete search history.

(56) References Cited

U.S. PATENT DOCUMENTS 5,587,343 A * 12/1996 Kano et al. ................ 438/52
6,091,082 A    7/2000 Thomas et al. ............. 257/777
6,114,862 A    9/2000 Tartagni et al. ............ 324/662
6,515,488 B1   2/2003 Thomas .................... 324/662
6,603,192 B1 * 8/2003 Thomas et al. ............. 257/635
6,686,227 B1 * 2/2004 Zhou et al. ................ 438/127

FOREIGN PATENT DOCUMENTS

| EP | 1 256 899 A1 | 11/2002 |
| WO | WO 01/06448 A1 | 1/2001 |
| WO | WO 03/098541 A1 | 11/2003 |

* cited by examiner

*Primary Examiner*—Anjan Deb
*Assistant Examiner*—John Teresinski
(74) *Attorney, Agent, or Firm*—Birch, Stewart, Kolasch & Birch, LLP

(57) ABSTRACT

A chip-type sensor against ESD and stress damages and contamination interference includes a substrate structure and a protection layer covering over the substrate structure. The protection layer includes, from bottom to top, a first layer for providing a first stress against the substrate structure, a second layer for providing a second stress against the substrate structure, and a third layer for providing a third stress against the substrate structure. The first stress and the third stress belong to one of a tensile stress and a compressive stress, and the second stress belongs to the other of the tensile stress and the compressive stress.

14 Claims, 6 Drawing Sheets

CHIP-TYPE SENSOR AGAINST ESD AND STRESS DAMAGES AND CONTAMINATION INTERFERENCE

BACKGROUND OF THE INVENTION

1. Field of the Invention

The invention relates to a chip-type sensor against ESD and stress damages and contamination interference, and more particularly to a chip-type fingerprint sensor having a surface protection layer structure for providing the effects against vertical forces, ESD (EelectroStatic Discharge) damage, and contamination caused by latent fingerprints. This invention correlates to the following commonly assigned patent applications: (1) U.S. patent application Ser. No. 10/403,052, filed on Apr. 1, 2003, and entitled "CAPACITIVE FINGERPRINT SENSOR"; (2) U.S. patent application Ser. No. 10/429,733, filed on May 6, 2003, and entitled "CAPACITIVE FINGERPRINT SENSOR AGAINST ESD DAMAGE AND CONTAMINATION INTERFERENCE AND A METHOD FOR MANUFACTURING THE SAME"; (3) Taiwan Patent Application Serial No. 092124697, filed on Sep. 8, 2003, and entitled "CAPACITIVE FINGERPRINT SENSOR CAPABLE OF PREVENTING A LATENT FINGERPRINT FROM REMAINING THEREON AND A METHOD FOR PROCESSING THE SAME"; and (4) Taiwan Patent Application Serial No. 092132480, filed on Nov. 20, 2003, and entitled "SURFACE PROCESSING METHOD FOR A CHIP DEVICE AND A CHIP DEVICE FORMED BY THE METHOD".

2. Description of the Related Art

Traditionally, IC design focuses on the electrical characteristics of the IC chip and the chip is packaged inside a protection body to prevent it from damaging by external force or ESD.

Nevertheless, some new applications need the chip surface to be partially exposed to the environment, for example, a chip-type fingerprint sensor, as disclosed in the above-mentioned application entitled "CAPACITIVE FINGERPRINT SENSOR", needs to provide a chip surface to be in contact with the finger, so that the ridges of the finger may be read for identification or verification.

Consequently, the mechanical property of the chip surface has to be well considered so that the protection structure of the chip can withstand the finger's vertical force and the ESD damage from the finger or other approaching objects. Also, in the capacitive fingerprint sensor, latent fingerprint interference on the captured image quality also has to be solved.

In the basic structure of the conventional capacitive fingerprint sensor chip, associated sense and control/processing circuits are formed in a silicon substrate, a plurality of metal plates arranged in an array is disposed on the chip and serves as the sense electrodes (the portion below the sense electrodes and including the sense and control/processing circuits and the silicon substrate is referred to as a substrate structure), and a dielectric layer is formed on an external surface of the chip to serve as the dielectric medium of the sense capacitor between the finger and each sense electrode as well as the protection layer for the exposed chip surface. In order to achieve the force-withstanding and wear-resistant properties of the chip surface, the prior art utilizes a hard coating material to form the protection layer on the external surface. For example, all of the WO 01/06448A1, WO 03/098541A1, U.S. Pat. No. 6,091,082, EP1256899, U.S. Pat. No. 6,114,862, and U.S. Pat. No. 6,515,488 patents disclose this architecture. In brief, the prior art patents include a hard layer, such as the silicon nitride, silicon carbide, aluminum oxide or diamond, formed above the substrate structure, or include a soft dielectric material, such as the silicon dioxide, formed between the hard layer and the substrate structure.

The hard layer, such as the silicon nitride, silicon carbide, aluminum oxide or diamond, has the good mechanical strength. However, when the hard layer is formed on the substrate structure using the semiconductor processing method, the thickness limitation thereof will be encountered because of the residual thermal stress between the hard layer and the substrate structure. In general, the silicon nitride, silicon carbide, aluminum oxide or diamond exhibits the tensile stress against the substrate structure mainly including the silicon substrate. If the hard layer is thick, it tends to crack owing to the stress. Consequently, the chip tends to crack and cannot withstand the ESD damage or force impingement. Typically, a single hard layer or a bimorph layer around 2 microns or less is formed on the sensor surface to overcome the above-mentioned problems due to the process limitation available in semiconductor factory. Nevertheless, a relatively large residual thermal stress still exists therein, which will induce material defects therein and form stress concentration points around those defects, and may easily be broken by external force or ESD. Hence, it is an important subject to reduce the residual thermal stress and thus increase the thickness of the protection structure because the mechanical strength is directly proportional to the third power of the thickness.

In addition to the above-mentioned mechanical property such as the force-withstanding property of the chip surface, the ESD damage is another important subject. There are two ways for solving the ESD damage. One way is to increase the thickness of the protection layer because the electrostatic field intensity that may be withstood is directly proportional to the square of the thickness.

In the typical commercial IC (integrated circuit) process, for example, the thickness of the protection layer (usually including a bimorph structure composed of the silicon dioxide and the silicon nitride) is about 1 micron, and the ESD damage voltage (air mode) that may be withstood is about 1 KV. Also, because the structure of the protection layer of the above-mentioned patents cannot be effectively increased in thickness, the protection against the ESD damage cannot be achieved only depending on the material property of the protection layer.

Hence, the other way is to utilize the exposed metal mesh structure to conduct the electrostatic charges to the ground, as mentioned in the above-mentioned patents WO 01/06448A1, WO 03/098541A1 and EP1256899. The concept of using the conductor to conduct the electrostatic charges has been adopted in many electronics products. However, the key issues having to be considered is the process and material compatibility when implementing the exposed metal mesh on the fingerprint sensor chip to solve the ESD problem.

For example, WO 01/06448A1 patent discloses this idea of an exposed metal mesh structure serving as the conducting structure for the electrostatic charges. However, the used manufacturing processes, the single layer TiN serving as the metal sense electrode material, and the exposed metal mesh material is not a standard processing step in commercial IC foundry. In addition, the thin TiN film may have the step coverage problem when it is formed on the rugged chip surface. Furthermore, because of the high resistivity of the TiN film, an arbitrarily large current caused by the electrostatic charges flowing therethrough may burn it out due to the joule heating effect. In addition, WO 03/098541A1 patent also discloses an exposed metal mesh structure, which is substantially the same as that of the WO 01/06448A1 patent, as the conducting structure for the electrostatic charges. The main difference therebetween is that the external surface of the exposed metal includes the gold material, which may solve the erosion problem of the metal. However, the manufacturing processes cannot be compatible with the silicon IC manufacturing processes because the gold material may cause contamination.

EP1256899 patent discloses a tungsten metal mesh design. However, in the step of depositing the tungsten metal and the subsequent etching back step, small cavities, which are regarded as defects and cause the problems such as stress concentration points around those defects, are formed on the sensor surface of the protection layer of silicon carbide. When the fingernail unintentionally hits the external surface of the sensor, the sensor may be damaged. Furthermore, the small cavities make the surface of the protection layer hydrophilic. Thus, the moisture of the finger tends to diffuse after the finger contacts the external surface, and the image quality is deteriorated accordingly. Consequently, a method is needed for refilling the small cavities with the silicon dioxide so as to make the external surface smooth by depositing the silicon dioxide followed by the CMP process. However, this way makes the manufacturing processes too complicated and is not suitable for the general manufacturing procedures of the commercial IC foundry.

Furthermore, when the above-mentioned technology is implemented in the capacitive fingerprint sensor, the protection layer material (the materials of the above-mentioned protection layers have the hydrophilic or lipophilic property) cannot prevent the finger's grease or sweat forming a latent fingerprint thereon after moving the finger from the sensor surface. Thus, the latent fingerprint influences the subsequent usage. Alternatively, the system may be attacked according to the latent fingerprint image.

Therefore, it is an important subject of the invention to provide a chip-type sensor against ESD and stress damages and contamination interference.

SUMMARY OF THE INVENTION

It is therefore an object of the invention to provide a chip-type fingerprint sensor against the ESD and stress damages and effectively avoiding the contamination interference so as to enhance the sensing effect of the sensor and lengthen the lifetime thereof.

To achieve the above-mentioned object, the invention provides a chip-type sensor against ESD and stress damages and contamination interference. The chip-type sensor includes a substrate structure and a protection layer covering over the substrate structure. The protection layer includes, from bottom to top, a first layer for providing a first stress against the substrate structure, a second layer for providing a second stress against the substrate structure, and a third layer for providing a third stress against the substrate structure. The first stress and the third stress belong to one of a tensile stress and a compressive stress, and the second stress belongs to the other of the tensile stress and the compressive stress so as to reduce the residual stress.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The chip-type sensor of the invention will be described by taking a fingerprint sensor as an example, wherein the fingerprint sensor may be a capacitive fingerprint sensor, a temperature gradient type (or thermal type) fingerprint sensor, a capacitive pressure type fingerprint sensor, or the like. However, the invention is not limited thereto.

Figure 1:
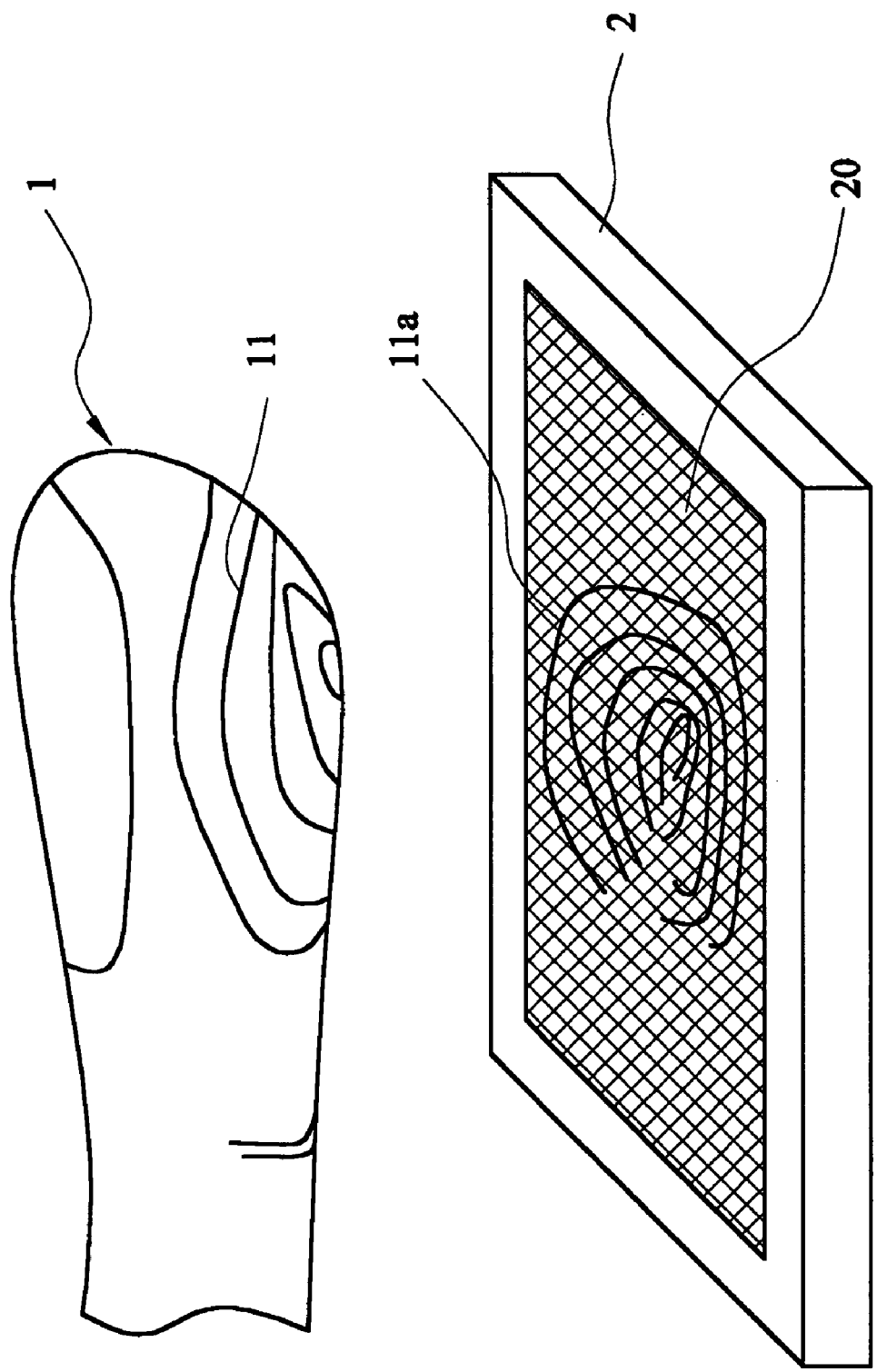
FIG. 1 is a schematic illustration showing a capacitive fingerprint sensor of the invention for reading the fingerprint.

FIG. 1 is a schematic illustration showing a capacitive fingerprint sensor of the invention for reading the fingerprint. As shown in FIG. 1, the fingerprint sensor 2 is formed on a silicon substrate and cut into a chip shape, and the main covering area corresponds to a plurality of capacitive sensing members 20 arranged in a 2D array and a peripheral control/processing circuit (not shown). A plurality of metal plates arranged in an array and serving as sense electrodes are disposed on the chip surface, wherein the portion below the sense electrodes and including the sense and control/processing circuits and the silicon substrate is referred to as a substrate structure. In addition, a dielectric layer is formed on an external surface of the chip to serve as the dielectric medium of the sense capacitor between the finger and each sense electrode as well as the protection layer for the exposed chip surface.

When a finger 1 contacts the sensor 2, irregular ridges 11 on the skin of the finger 1 contact the capacitive sensing members 20 and capacitance curves 11a corresponding to the ridges 11 may be obtained from the sensor 2. By measuring the capacitance curves 11a, the shape of the fingerprint ridges 11 may be obtained.

Figure 2:
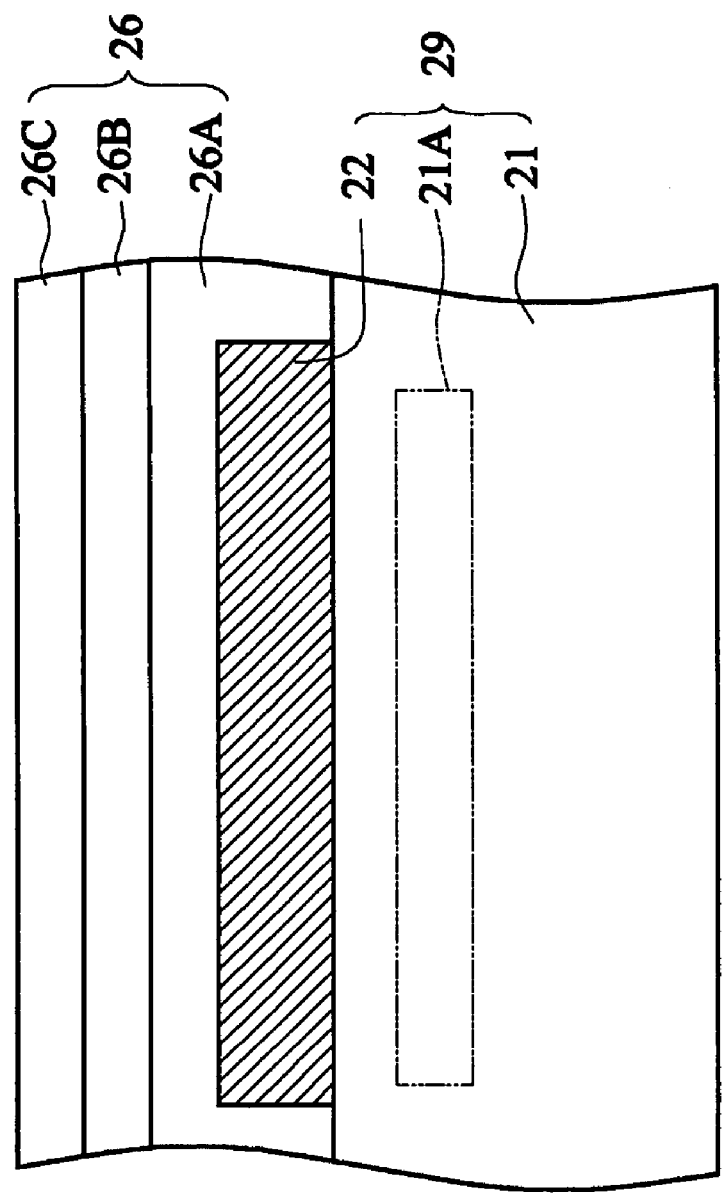
FIG. 2 is a partially schematic side view showing a capacitor sensing member of FIG. 1 according to a first embodiment of the invention.

FIG. 2 is a partially schematic side view showing a capacitor sensing member of FIG. 1 according to a first embodiment of the invention. As shown in FIG. 2, the capacitive fingerprint sensor of the invention includes a silicon substrate 21, a plurality of sense electrodes 22 (only one electrode is shown in the drawing), and a protection layer 26. The silicon substrate 21 contains a sense circuit 21A corresponding to each sense electrode 22, and includes a signal processing/control circuit 21B (schematically shown in FIG. 4) around the sensing member array, wherein the detailed arrangements of the sensing member array and the peripheral circuit may be found in the above-mentioned disclosure entitled "CAPACITIVE FINGERPRINT SENSOR". The sense electrode 22 is positioned on the silicon substrate 21 and is electrically connected to the sense circuit 21A, wherein the portion below the sense electrode 22 and including the sense circuits 21A, the signal processing/control circuit 21B, and the silicon substrate 21 is referred to as the substrate structure 29. The protection layer 26 covers over the substrate structure 29. Thus, in this embodiment, the substrate structure 29 includes a silicon substrate 21 and a plurality of sense electrodes 22. The silicon substrate 21 contains a plurality of sense circuits 21A and a signal processing/control circuit 21B. A plurality of sense electrodes 22 arranged in an array is formed on the silicon substrate 21, and correspondingly electrically connected to the sense circuits 21A.

The protection layer 26 is entirely immovable relative to the substrate structure 29 and includes, from bottom to top, first to third layers 26A to 26C. The first layer 26A provides a first stress against the substrate structure 29. The second layer 26B provides a second stress against the substrate structure 29. The third layer 26C provides a third stress against the substrate structure 29.

In one example, the first stress and the third stress belong to a tensile stress, while the second stress belongs to a compressive stress. That is, the tensile stresses provided by the first layer 26A and the third layer 26C are compensated by the compressive stress provided by the second layer 26B such that the residual thermal stress of the protection layer 26 is reduced. In this case, each of the first layer 26A and the third layer 26C is a single layer made of silicon nitride, silicon carbide, diamond-like carbon material or diamond material, or a composite layer having multiple layers each being made of silicon nitride, silicon carbide, diamond-like carbon material and diamond material, and the second layer 26B is made of silicon dioxide. In this embodiment, the preferred combination of the first to third layers is silicon nitride/silicon dioxide/silicon nitride because the layers may be formed according to the processes compatible with the commercial IC process and the manufacturing cost may thus be reduced. Meanwhile, the thicknesses of the two layers of silicon nitride in this embodiment may be different in order to keep proper stresses in the structure.

In another example, the first stress and the third stress belong to the compressive stress, and the second stress belongs to the tensile stress. That is, the compressive stresses provided by the first layer 26A and the third layer 26C are compensated by the tensile stress provided by the second layer 26B, such that the residual thermal stress of the protection layer 26 is reduced. In this case, the first layer 26A and the third layer 26C are made of silicon dioxide, and the second layer is a single layer made of silicon nitride, silicon carbide, diamond-like carbon material or diamond material, or a composite layer having multiple layers each being made of silicon nitride, silicon carbide, diamond-like carbon material and diamond material. In this embodiment, the preferred combination of the first to third layers is silicon dioxide/silicon nitride/silicon dioxide because the layers may be formed according to the processes compatible with the commercial IC process and the manufacturing cost may thus be reduced. Meanwhile, the thicknesses of the two layers of silicon dioxide in this embodiment may be different in order to keep proper stresses in the structure.

According to the sandwich structure of the protection layer of the invention, the residual stress of the overall protection layer may be reduced. Thus, it is possible to increase the thickness of the protection layer so as to provide good effects in the aspects of mechanical intensity (directly proportional to the third power of thickness) and the ESD protection (the electric field intensity that may be withstood is directly proportional to the square of thickness). In the embodiment of the invention, the preferable thickness of the protection layer is larger than 3 to 5 microns. So, the mechanical intensity is at least three times larger than that of the prior art protection layer with the thickness of 1 to 2 microns. Meanwhile, compared to the protection layer, which is formed according to the commercial IC processes and has the thickness of about 1 micron, the electrostatic field that may be withstood in the embodiment of the invention may be increased to at least eight times.

Figure 3:
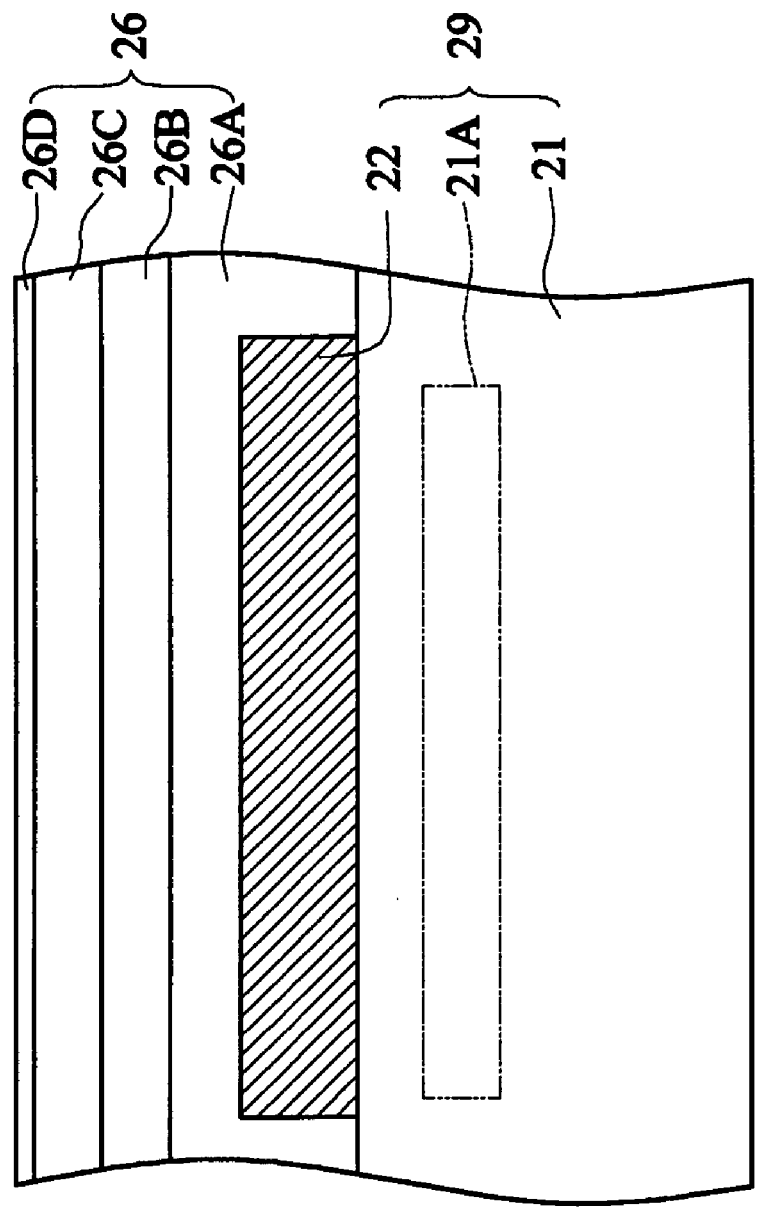
FIG. 3 is a partially schematic side view showing the capacitor sensing member of FIG. 1 according to a second embodiment of the invention.

FIG. 3 is a partially schematic side view showing the capacitor sensing member of FIG. 1 according to a second embodiment of the invention. Referring to FIG. 3, in addition to the above-mentioned sandwich structure, the protection layer 26 further includes a fourth layer 26D applied to the third layer 26C so as to provide a hydrophobic and lipophobic surface to be in contact with the finger and prevent the latent fingerprint from being formed thereon. In one embodiment, the fourth layer 26D is a polymeric material which is made of Teflon or Teflon-like chemical structure. Alternatively, the polymeric material layer 26D is formed on the third layer 26C using a polymeric monomer solution, which has monomers, a fluorocarbon (FC) polymer end, and a polar silane group. The FC polymer end is exposed to the outside and has a soft fragment FC polymer bond for protecting an integrated circuit from the external contamination. The polar silane group is for firmly fixing the polymeric material layer 26D to the third layer 26C. In another embodiment, the fourth layer 26D may be a ceramic atomic layer, for example, aluminum oxide and titanium oxide layer to form the same hrdrophobic and lipophobic surface. (Please refer to Taiwan Patent Application Serial No. 092124697, filed on Sep. 8, 2003, and entitled "CAPACITIVE FINGERPRINT SENSOR CAPABLE OF PREVENTING A LATENT FINGERPRINT FROM REMAINING THEREON AND A METHOD FOR PROCESSING THE SAME"; and Taiwan Patent Application Serial No. 092132480, filed on Nov. 20, 2003, and entitled "SURFACE PROCESSING METHOD FOR A CHIP DEVICE AND A CHIP DEVICE FORMED BY THE METHOD".)

Figure 4:
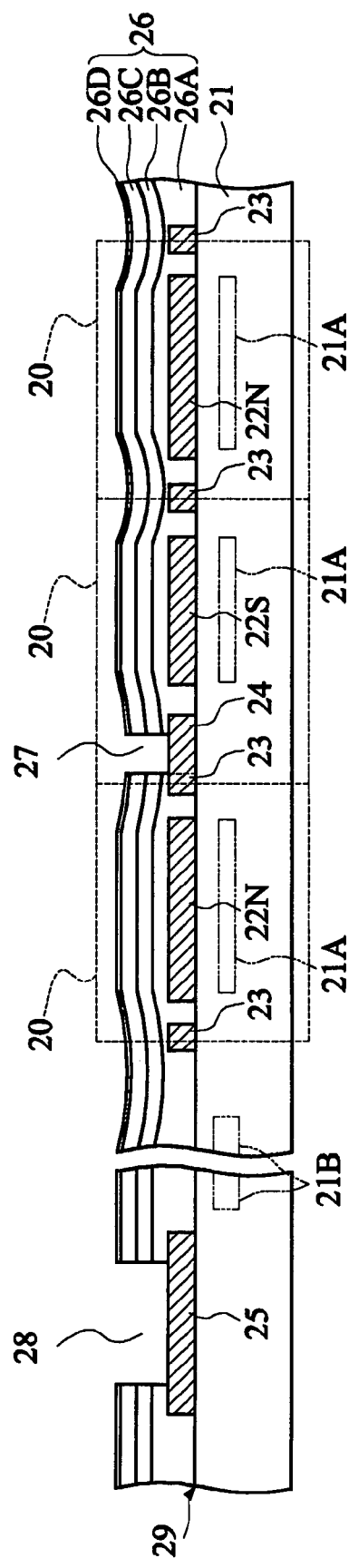
FIG. 4 is a schematically cross-sectional view showing the capacitive fingerprint sensor of FIG. 3.

Except for that the protection layer structure designed for the purpose of stress compensation may greatly increase the force-withstanding capability and ESD protection, the ESD protection of the chip-type fingerprint sensor of the invention may be further enhanced, as shown in FIG. 4, which shows another embodiment for ESD protection. FIG. 4 is a schematically cross-sectional view showing the capacitive fingerprint sensor of FIG. 3. Referring to FIG. 4, the capacitive fingerprint sensor 2 of the invention basically includes a silicon substrate 21 having a plurality of sense circuits and a signal processing/control circuit, a plurality of plate electrodes 22 serving as the sense electrodes, a metal mesh 23, a plurality of ESD units 24, a plurality of bonding pads 25, and a protection layer 26. In this embodiment, the substrate structure 29 may be regarded as including the silicon substrate 21, the plate electrode 22, the metal mesh 23, the ESD unit 24, and the bonding pad 25. The plate electrodes 22 arranged in an array are formed on the silicon substrate 21. The metal mesh 23 is formed between plate electrodes 22 and flush with the plate electrodes 22, and surrounds each plate electrode 22. In detail, the metal mesh 23 crisscrosses between the plate electrodes 22 and located between their intervals. The plate electrode 22 and the metal mesh 23 are spaced apart by a predetermined spacing. The bonding pads 25 serve as input/output portions of the capacitive fingerprint sensor 2. The metal mesh 23 is connected to the ground GND in order to conduct the electrostatic charges to the ground GND and prevent the sensor from the ESD damage. The ESD units 24 are connected to the metal mesh 23 and are thus grounded. The spacing D between two adjacent ESD units 24 is far greater than the spacing between two adjacent plate electrodes 22. So, the number of the ESD units 24 is far smaller than that of the plate electrodes 22.

The protection layer 26 completely covers over the plate electrodes 22 and the metal mesh 23, and partially covers over the ESD units 24 and the bonding pads 25. The protection layer 26 is formed with a plurality of first openings 27 above the ESD units 24, and a plurality of second openings 28 above the bonding pads 25. It is to be noted that the dimension of each first opening 27 is far smaller than that of each second opening 28.

Figure 6:
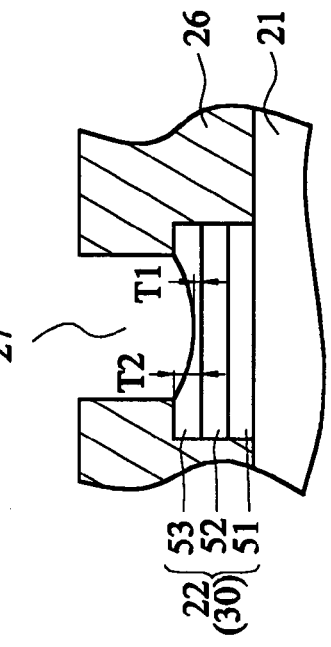
FIG. 6 is a schematically enlarged illustration showing a bonding pad of FIG. 4.
Figure 5:
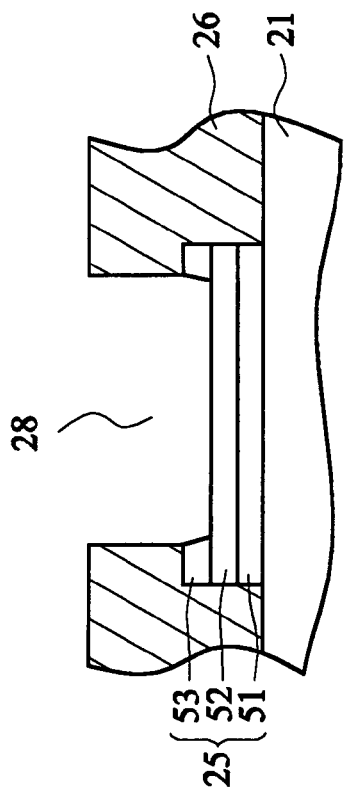
FIG. 5 shows a schematically partially cross-sectional view of FIG. 4.

FIG. 5 shows a schematically partially cross-sectional view of FIG. 4. FIG. 6 is a schematically enlarged illustration showing a bonding pad of FIG. 4. Referring to FIGS. 5 and 6, the laminated aluminum layer 30 includes a titanium layer 51 on the substrate 21, an aluminum alloy layer 52 on the titanium layer 51, and a titanium nitride layer 53 on the aluminum alloy layer 52. The aluminum alloy layer 52 is exposed from each first opening 27. Each bonding pad 25 includes a titanium layer 51 on the substrate 21, an aluminum alloy layer 52 on the titanium layer 51 and exposed from each second opening 28, and a titanium nitride layer 53 on the aluminum alloy layer 52 and surrounding each second opening 28. It is to be noted that a middle thickness T1 of the titanium nitride layer 53 in each first opening 27 is smaller than a peripheral thickness T2 of the titanium nitride layer 53 owing to the etching property, and the titanium nitride layer 53 in each second opening 28 is substantially completely removed.

Figure 7:
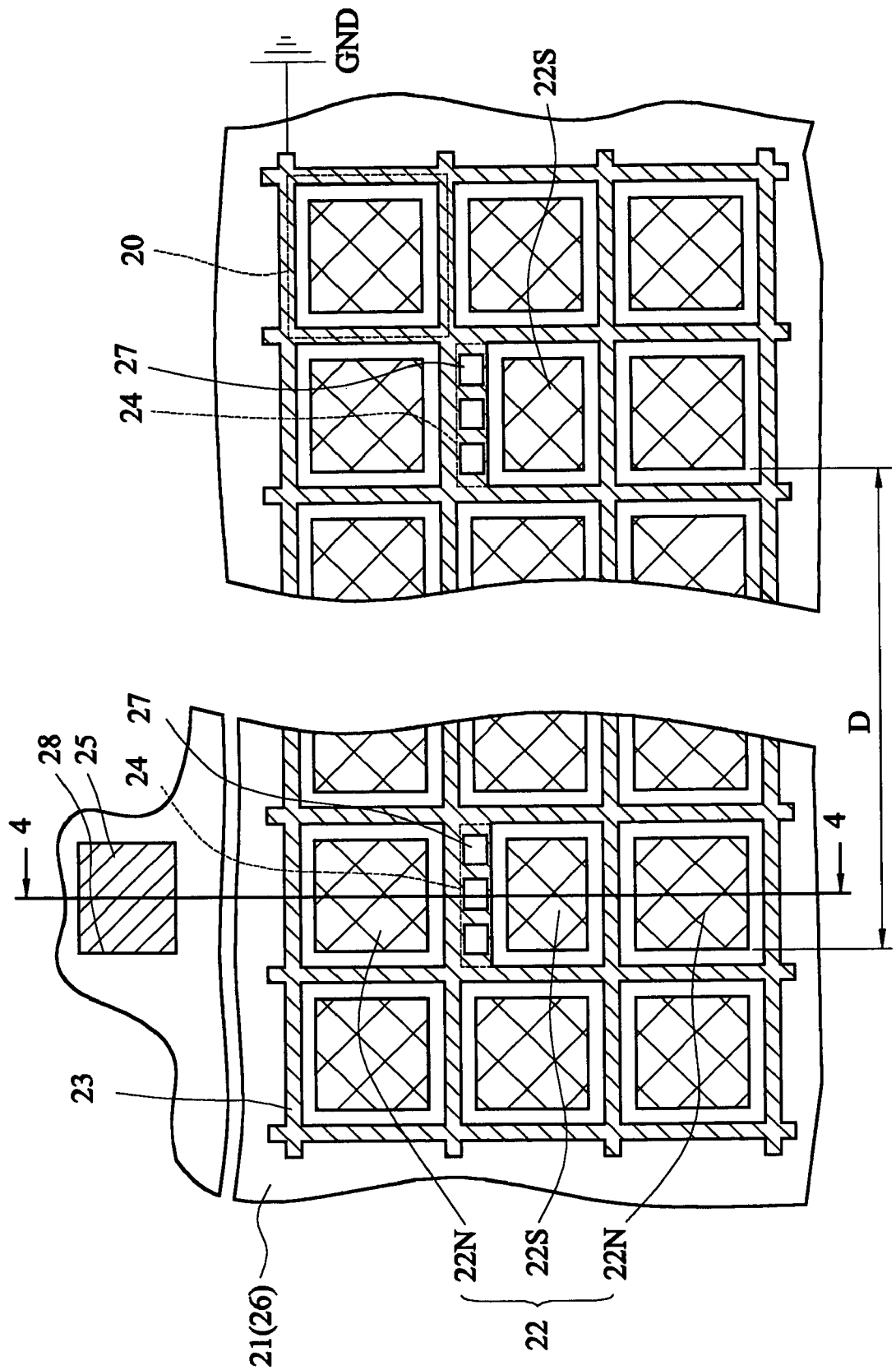
FIG. 7 is a partially schematic top view showing a capacitive fingerprint sensor of FIG. 4.

FIG. 7 is a partially schematic top view showing a capacitive fingerprint sensor of FIG. 4. The side view of FIG. 4 may be obtained by taking along the line 4—4 of FIG. 7. As clearly shown in FIG. 7, some plate electrodes sacrifice their sensing areas in order to form the ESD units 24 without influencing the sensor effects. Thus, the plate electrodes 22 include a plurality of sacrificial electrodes 22S and a plurality of standard electrodes 22N. The sacrificial electrodes 22S are adjacent to the ESD units 24 and the dimension of each sacrificial electrode 22S is smaller than that of each standard electrode 22N. In this embodiment, each ESD unit 24 is only adjacent to one sacrificial electrode 22S. Thus, there is only one sacrificial electrode 22S among nine plate electrodes 22.

The plate electrodes 22 and the metal mesh 23 may be made of the same material. For example, the plate electrodes 22 and the metal mesh 23 is the topmost metal film including the laminated aluminum layer 30 or laminated copper layer, formed in the IC manufacturing processes. A sense capacitance between the finger and each sense electrode is formed between each plate electrode 22 and the finger 1, and the metal mesh 23 is used for avoiding ESD damage. That is, each of the sense electrodes forms a sense result with the finger 1, and the sense result is sensed by the chip-type sensor.

When the finger approaches the sensor, the electrostatic charges may be conducted from the first openings 27 to the ground GND via the metal mesh 23. In this embodiment, the optimum spacing D between two adjacent ESD units 24 ranges from 500 to 1000 microns.

Figure 8:
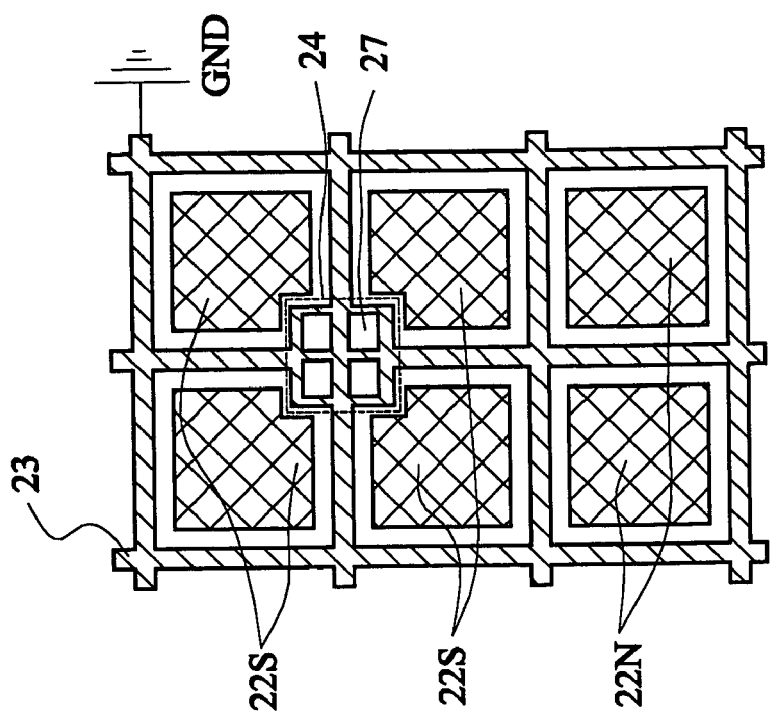
FIG. 8 is a schematic top view showing a capacitive fingerprint sensor according to a third embodiment of the invention.

FIG. 8 is a schematic top view showing a capacitive fingerprint sensor according to a third embodiment of the invention. The sensor of FIG. 8 is similar to that of FIG. 7 except for the difference residing in that each ESD unit 24 of FIG. 8 is only adjacent to two sacrificial electrodes 22S. That is, each of the two adjacent plate electrodes 22 sacrifices a region to be used by the ESD unit 24.

Figure 9:
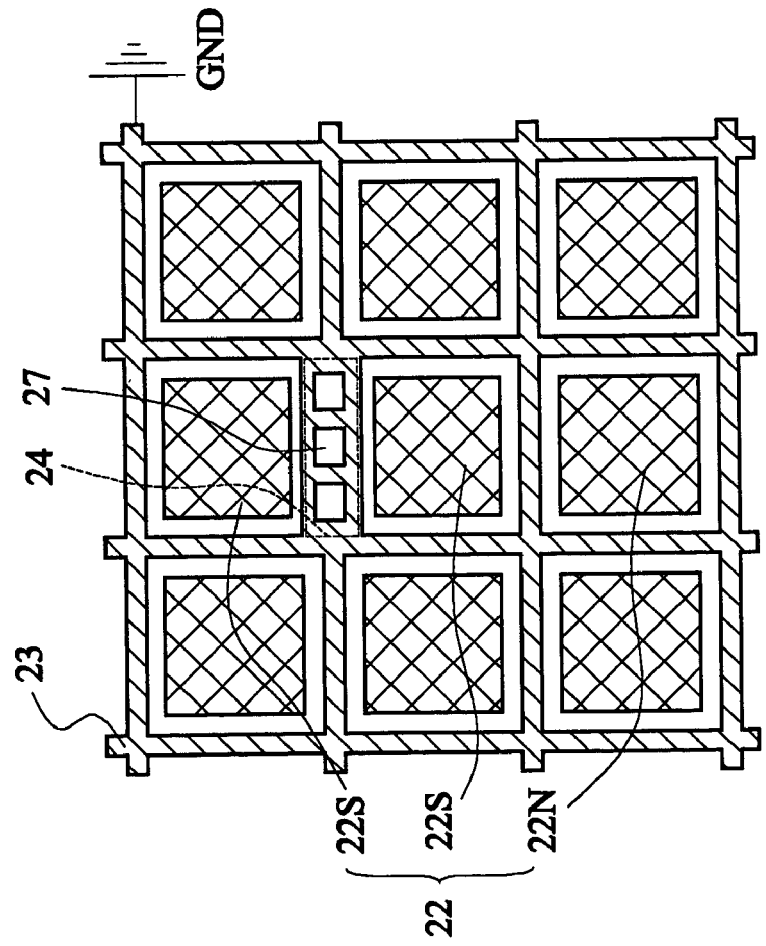
FIG. 9 is a schematic top view showing a capacitive fingerprint sensor according to a fourth embodiment of the invention.

FIG. 9 is a schematic top view showing a capacitive fingerprint sensor according to a fourth embodiment of the invention. The sensor of FIG. 9 is similar to that of FIG. 7 except for the difference residing in that each ESD unit 24 of FIG. 9 is only adjacent to four sacrificial electrodes 22S. That is, each of the four adjacent plate electrodes 22 sacrifices a region to be used by the ESD unit 24.

According to the above-mentioned structure, the first openings 27 for the ESD units 24 and the second openings 28 for the bonding pads 25 are formed using the same mask, but the dimension of each first opening 27 is far smaller than that of each second opening 28. For example, the dimension of the first opening 27 typically ranges from 5 to 10 microns, and that of the second opening 28 typically ranges from 100 to 150 microns. Consequently, in the formation of the openings, the protection layer 26 can be completely removed to form the second openings 28, and the topmost titanium nitride layer 53 also may be completely removed with the aluminum alloy layer 52 completely exposed so as to facilitate the subsequent wire bonding process. One of ordinary skill in the art may easily understand that the dry-etching method for forming the openings has loading effects, which means that the smaller opening is etched in a lower speed. The invention utilizes this property to remain partial titanium nitride layer 53 (0.1 microns thick) inside the first opening 27 by controlling the etching time. Since the titanium nitride layer 53 is stable in oxidized environment and chemically resistant, it is suitable for long-term exposure to the air. Consequently, the electrostatic charges of an object approaching the sensor may be conducted to the ground through the first openings 27, the titanium nitride layer 53, and the aluminum alloy layer 52, and the ESD damage can be avoided accordingly. In addition, the metal mesh material and manufacturing processes adopted in this invention are completely equivalent to any commercial IC processes. The ESD protection metal mesh and the sense electrodes are finished during the topmost layer, such as the aluminum or copper layer, manufacturing process. Thus, it is possible to avoid the prior art incompatibility of the manufacturing processes or materials.

The above-mentioned manufacturing processes include no complicated processes as used in the prior art, and the sensor of the invention may be manufactured using standard processes and materials as used in the commercial integrated circuit foundry.

The advantages of the invention are described as follows. The sensor possesses the ability against ESD damage by using only a few amount of ESD units separating from one another in a large spacing. Even if the contaminations are left on the sensor, most contaminations are independent and are not connected to the metal mesh 23. Thus, the interference on the sensed image caused by the contamination capacitance may be reduced.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A chip-type sensor against ESD and stress damages and contamination interference, the chip-type sensor comprising:
   a substrate structure; and
   a protection layer covering over the substrate structure, wherein the protection layer is entirely immovable relative to the substrate structure and comprises, from bottom to top:
   a first layer for providing a first stress against the substrate structure;
   a second layer for providing a second stress against the substrate structure; and
   a third layer for providing a third stress against the substrate structure, wherein the first stress and the third stress belong to one of a tensile stress and a compressive stress, and the second stress belongs to the other of the tensile stress and the compressive stress, wherein:
   the substrate structure comprises: a silicon substrate having a plurality of sense circuits; and a plurality of sense electrodes, which is arranged in an array on the silicon substrate, corresponds to the sense circuits, and electrically connected to the sense circuits, respectively;
   each of the sense electrodes forms a sense result with a finger, and the sense result is sensed by the chip-type sensor; and
   the protection layer further comprises a polymeric material or ceramic atomic layer applied onto the third layer to provide a hydrophobic and lipophobic surface, which is to be in contact with the finger, so as to prevent a latent fingerprint from being formed thereon.

2. The chip-type sensor according to claim 1, wherein each of the first layer and the third layer is made of silicon dioxide, and the second layer is a single layer made of silicon nitride, silicon carbide, diamond-like carbon material or diamond material, or a composite layer having multiple layers each being made of silicon nitride, silicon carbide, diamond-like carbon material and diamond material.

3. The chip-type sensor according to claim 1, wherein the second layer is made of silicon dioxide, and each of the first layer and the third layer is a single layer made of silicon nitride, silicon carbide, diamond-like carbon material or diamond material, or a composite layer having multiple layers each being made of silicon nitride, silicon carbide, diamond-like carbon material and diamond material.

4. The chip-type sensor according to claim 1, wherein the polymeric material layer is made of Teflon or Teflon-like chemical structure material.

5. The chip-type sensor according to claim 1, wherein the polymeric material layer is formed on the third layer using a polymeric monomer solution having a plurality of monomers, each of which has a fluorocarbon (FC) polymer end and a polar silane group, the FC polymer end is exposed to protect an integrated circuit from external contamination, and the polar silane group is for firmly fixing the polymeric material layer to the third layer.

6. The chip-type sensor according to claim 5, wherein the FC polymer end has a soft fragment FC polymer bond.

7. The chip-type sensor according to claim 1, wherein the ceramic atomic layer is an aluminum oxide layer or a titanium oxide layer.

8. The chip-type sensor according to claim 1, wherein the protection layer has a thickness greater than 2 microns.

9. The chip-type sensor according to claim 1, wherein the protection layer has a thickness ranging from 3 to 5 microns.

10. The chip-type sensor according to claim 1, wherein the substrate structure further comprises:
    a metal mesh crisscrossing between sense electrodes, being flush with the sense electrodes, and surrounding each of the sense electrodes, wherein the metal mesh is connected to a ground, and the protection layer completely covers over the metal mesh.

11. The chip-type sensor according to claim 10, wherein the substrate structure further comprises:
    a plurality of ESD units connected to the metal mesh and formed between a predetermined number of adjacent sense electrodes among the sense electrodes, wherein the number of the ESD units is smaller than that of sense electrodes, and the protection layer partially covers over the ESD units.

12. The chip-type sensor according to claim 11, wherein the substrate structure further comprises:
    a plurality of bonding pads serving as input/output portions of the chip-type sensor, wherein the protection layer partially covers over the bonding pads so as to form a plurality of first openings above the ESD units and a plurality of second openings above bonding pads, and a dimension of each of the first openings is smaller than that of each of the second openings.

13. The chip-type sensor according to claim 11, wherein a spacing between two adjacent ESD units substantially ranges from 500 to 1000 microns.

14. The chip-type sensor according to claim 1, wherein the sense electrodes comprise a plurality of sacrificial electrodes and a plurality of standard electrodes, the sacrificial electrodes are adjacent to the ESD units, respectively, and a dimension of each of the sacrificial electrodes is smaller than that of each of the standard electrodes.

* * * * *